(12) United States Patent
Ohta et al.

(10) Patent No.: US 8,289,657 B2
(45) Date of Patent: Oct. 16, 2012

(54) ACTUATOR MECHANISM FOR MAGNETIC DISK DRIVE

(75) Inventors: Mutsuro Ohta, Kanagawa (JP);
Masakazu Sasaki, Kanagawa (JP);
Takeshi Chawanya, Kanagawa (JP);
Kenji Suzuki, Kanagawa (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 528 days.

(21) Appl. No.: 12/286,084

(22) Filed: Sep. 25, 2008

(65) Prior Publication Data
US 2009/0086377 A1 Apr. 2, 2009

(30) Foreign Application Priority Data

Sep. 28, 2007 (JP) ................................ 2007-255814

(51) Int. Cl.
*G11B 5/54* (2006.01)
(52) U.S. Cl. .................................................. 360/264.3
(58) Field of Classification Search ............... 360/264.3
See application file for complete search history.

(56) References Cited

U.S. PATENT DOCUMENTS

| | | | | |
|---|---|---|---|---|
| 5,122,702 A | * | 6/1992 | Nakazato | 310/13 |
| 5,295,031 A | * | 3/1994 | Wasson | 360/264.9 |
| 5,801,904 A | * | 9/1998 | Kinoshita et al. | 360/256.2 |
| 6,342,987 B1 | * | 1/2002 | Hattori et al. | 360/78.05 |
| 6,816,343 B1 | * | 11/2004 | Oveyssi | 360/265 |
| 2005/0162782 A1 | * | 7/2005 | Tsuda et al. | 360/264.7 |
| 2005/0254177 A1 | * | 11/2005 | Suzuki et al. | 360/264.9 |

* cited by examiner

*Primary Examiner* — Mark Blouin

(57) ABSTRACT

Embodiments of the present invention help provide a simple and inexpensive actuator mechanism for a magnetic disk drive. The actuator mechanism includes an approximately circular coil and a simple shaped magnet, and is capable of displaying adequate performance required for the magnetic disk drive. According to one embodiment, the magnetic disk drive includes an actuator mechanism which has an approximately circular coil and an approximately rectangular magnet. The long axis direction of the rectangular magnet is oriented in parallel to a straight line connecting the center of the inner circle of the circular coil in a state in which the actuator is positioned at the outermost circumference of a data area and the center of the inner circle of the circular coil in a state in which the actuator is positioned at the innermost circumference of the data area.

10 Claims, 8 Drawing Sheets

ACTUATOR MECHANISM FOR MAGNETIC DISK DRIVE

CROSS-REFERENCE TO RELATED APPLICATION

The instant nonprovisional patent application claims priority to Japanese Patent Application No. 2007-255814 filed Sep. 28, 2007 and which is incorporated by reference in its entirety herein for all purposes.

BACKGROUND OF THE INVENTION

In a magnetic disk drive, a magnetic head held by an actuator mechanism is positioned over a predetermined track on a rotating magnetic disk and reads or writes data. On the magnetic disk, an area where data can be recorded is defined. When the magnetic disk drive stops operating, the magnetic disk is moved for data protection to a predetermined position outside the area by the actuator mechanism. While the magnetic disk drive is stopped, the magnetic head is held at the predetermined position.

The actuator mechanism is driven by a voice coil motor (VCM). The VCM includes a coil attached to the actuator and a magnet disposed to face the coil. The actuator is fixed to a pivot shaft. When the coil is energized, a dielectric force generated in a portion facing the magnet of the coil swings the actuator about the pivot shaft.

The dielectric force, however, includes force components which are not required to swing the actuator about the pivot shaft because of, for example, an effect of the shape of the coil. Such force components excite, for example, vibration mode in a direction of bending a coil fixing section (coil support) of the actuator (i.e. bending mode) or in a direction of twisting the coil support (i.e. torsion mode). This deteriorates the positioning performance of the actuator mechanism.

The coil and magnet to be included in an actuator mechanism are therefore determined such that they can provide an adequate driving force to allow the magnetic disk drive to fully display its performance and also such that they are shaped to reduce the unwanted force components.

In Japanese Patent Publication No. 2005-327407 ("patent document 1"), an actuator mechanism including a circular coil and a magnet having a concave outer circumference is disclosed.

In recent years, magnetic disk drives have started being widely used not only in the field of storage devices for computers, but also in the field of home appliances including, for example, DVD recorders incorporating a magnetic disk drive. In the field of home appliances, performance requirements for magnetic disk drives are not so severe as in the field of applications to computers. Instead, it is demanded that their prices be held low.

Therefore, in designing magnetic disk drives for use in home appliances, it is necessary to reduce the costs of parts and assembly while securing minimum required functions, for example, by reducing the amount of materials to be used or the number of parts to be used. The access time of a hard disk apparatus for use in a home appliance, for example, can be slower than that of a hard disk apparatus for use in a computer, so that, for the hard disk apparatus for use in a home appliance, the volume of magnet to be included in a voice coil motor (VCM) for driving an actuator can be reduced for a cost reduction.

Compared with a magnetic disk drive using a related-art longitudinal magnetic recording system, a magnetic disk drive using a perpendicular magnetic recording system offers a dramatically enhanced magnetic recording density resulting in an improved data transfer rate. Since the data transfer rate is a major factor in determining the performance of a magnetic disk drive, such an improved data transfer rate can make up for the performance deterioration attributable to the slower access time.

Generally, the coil included in an actuator mechanism is approximately trapezoidally shaped having an arced bottom. The actuator is driven by the dielectric force generated, when the coil is energized, on both sides of the approximately trapezoidal shape. The coil is made by winding wire, to which a predetermined tensile force is applied, on an approximately trapezoidal winding core which is to make up the inner circumference of the coil. When this is done, the tensile force applied to the wire portion wound around the top of the approximately trapezoidal shape becomes larger than the tensile force applied to other portions of the wire. This can cause individual coils to be finished into non-uniform shapes and results in a reduced yield in coil production.

The actuator mechanism disclosed in the patent document 1 uses an approximately circular coil. Since the inner circumference of the coil is circular, the wire being wound in the coil production process is subjected to a uniform tensile force. This can prevent the above-described yield reduction and can eventually contribute toward reducing the cost of the coil as a component of the actuator mechanism.

Patent document 1 discloses a magnet having a concave outer circumference for use in combination with the approximately circular coil. The circular coil that generates the dielectric force to drive the actuator has no straight linear portion, so that the dielectric force generated by the circular coil includes unwanted force components which excite, for example, vibration mode in a direction of bending the coil support of the actuator or in a direction of twisting the coil support as described above. Furthermore, depending on the position of the actuator, the position and shape of the effective coil portion that generates, using the magnetic field of the magnet, the dielectric force for driving the actuator vary. Hence, the unwanted force components vary depending on the position of the actuator. The magnet having a concave outer circumference is designed to adjust the shape of the effective portion of the magnet depending on the position of the actuator so as to suppress, as much as possible, the generation of the unwanted force components.

Because the concave outer circumference of the magnet is special, it is necessary, in the magnet production process, to shape the magnet one by one by punching using a die. This complicates the magnet production process and therefore may pose a cost disadvantage.

BRIEF SUMMARY OF THE INVENTION

Embodiments of the present invention provide a simple and inexpensive actuator mechanism for a magnetic disk drive. The actuator mechanism includes an approximately circular coil and a simple shaped magnet, and is capable of displaying adequate performance required for the magnetic disk drive. According to one embodiment, the magnetic disk drive includes an actuator mechanism which has an approximately circular coil and an approximately rectangular magnet. The long axis direction of the rectangular magnet is oriented in parallel to a straight line connecting the center of the inner circle of the circular coil in a state in which the actuator is positioned at the outermost circumference of a data area and the center of the inner circle of the circular coil in a state in which the actuator is positioned at the innermost circumference of the data area.

DETAILED DESCRIPTION OF THE INVENTION

Figure 1:
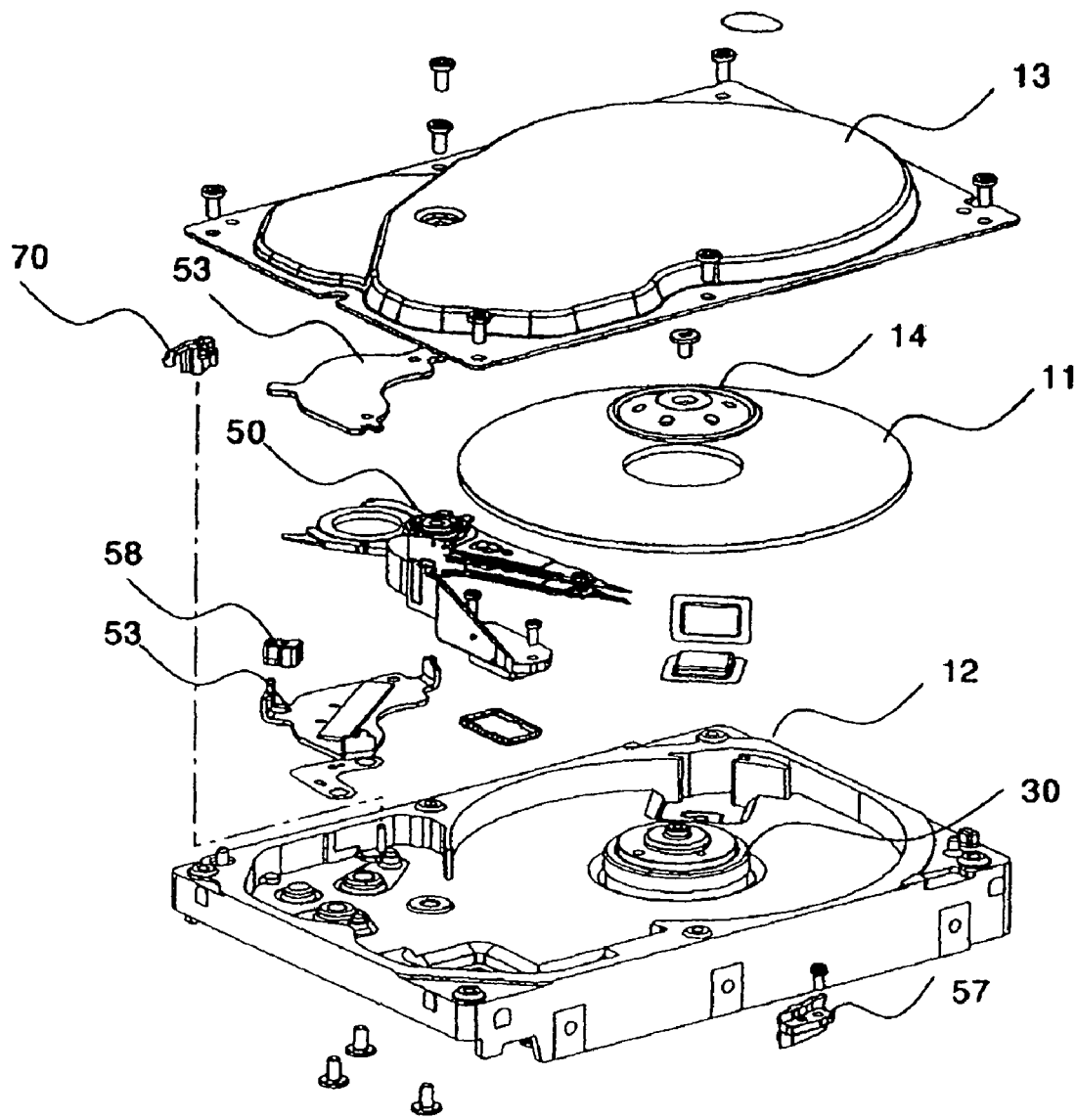
FIG. 1 is an exploded perspective view of a magnetic disk drive according to an embodiment of the invention.

Embodiments of the present invention relate to a magnetic disk drive. More particularly, certain embodiments relate to an actuator mechanism for positioning a magnetic head over a predetermined position on a magnetic disk.

Embodiments of the present invention have been made in view of the above problems, and it is an object of embodiments of the invention to provide a simple and inexpensive actuator mechanism for a magnetic disk drive, the actuator mechanism including an approximately circular coil and a simple shaped magnet and being capable of displaying adequate performance required for the magnetic disk drive.

To address the above problems, the magnetic disk drive according to embodiments of the present invention includes an actuator mechanism which has an approximately circular coil and an approximately rectangular magnet.

In the above magnetic disk drive according to embodiments of the invention, a long axis direction of the rectangular magnet is oriented parallel to a straight line connecting two points, one of the two points being a center of an inner circle of the circular coil in a state in which an actuator is positioned at an outermost circumference of a data area, the other of the two points being the center of the inner circle of the circular coil in a state in which the actuator is positioned at an innermost circumference of the data area.

In the above magnetic disk drive according to embodiments of the invention, a length in a short axis direction of the rectangular magnet is equal to or shorter than a diameter of the inner circle of the circular coil.

In the above magnetic disk drive according to embodiments of the invention, the length in the short axis direction of the rectangular magnet is equal to or shorter than a length of a straight line connecting intersection points between the inner circle of the circular coil in a state in which the actuator is positioned at the outermost circumference of the data area and the inner circle of the circular coil in a state in which the actuator is positioned at the innermost circumference of the data area.

In the above magnetic disk drive according to embodiments of the invention, a central long axis of the rectangular magnet is positioned on a side opposite to a pivot shaft with respect to the straight line connecting two points, one of the two points being the center of the inner circle of the circular coil in a state in which the actuator is positioned at the outermost circumference of the data area, the other of the two points being the center of the inner circle of the circular coil in a state in which the actuator is positioned at the innermost circumference of the data area.

In the above magnetic disk drive according to embodiments of the invention, the center of the inner circle of the circular coil in a state in which the actuator is positioned at a middle circumference of the data area is positioned on a side opposite to the pivot shaft with respect to the central long axis of the rectangular magnet.

In the above magnetic disk drive according to embodiments of the invention, the central long axis of the rectangular magnet passes an area surrounded by the straight line connecting two points, one of the two points being the center of the inner circle of the circular coil in a state in which the actuator is positioned at the outermost circumference of the data area, the other of the two points being the center of the inner circle of the circular coil in a state in which the actuator is positioned at the innermost circumference of the data area, and a circular arc about the pivot shaft, the circular arc passing the center of the inner circle of the circular coil in a state in which the actuator is positioned at the middle circumference of the data area and the two points.

In the above magnetic disk drive according to embodiments of the invention, the straight line connecting the intersection points between the inner circle of the circular coil in a state in which the actuator is positioned at the outermost circumference of the data area and the inner circle of the circular coil in a state in which the actuator is positioned at the innermost circumference of the data area and a neutral line of the rectangular magnet are overlapped with each other.

In the above magnetic disk drive according to embodiments of the invention, a first end face in the long axis direction of the rectangular magnet is positioned outside the outer circumference of the circular coil in a state in which the actuator is held at a home position and a second end face in the long axis direction of the rectangular magnet is positioned outside the outer circumference of the circular coil in a state in which the actuator is in contact with a crash stop on an inner circumference side.

Embodiments of the present invention can provide a simple and inexpensive actuator mechanism for a magnetic disk drive. The actuator mechanism includes an approximately circular coil and a simple shaped magnet, and is capable of displaying adequate performance required for the magnetic disk drive.

Embodiments of the present invention will be described below. Even though the description of particular embodiments of the invention follows, the invention is not limited to these embodiments. For the sake of clarity, the following description and the attached drawings are, where appropriate, partly omitted and simplified. Those skilled in the art will be able to easily modify, add to, or convert the elements of the following embodiments within the scope of the invention. In the attached drawings, the same elements are denoted by the same reference codes and, where appropriate for clarity, descriptive duplication is avoided.

First, to make the characteristics of the following embodiments easily understandable, an overall structure of a magnetic disk drive will be outlined.

FIG. 1 is an exploded perspective view of a magnetic disk drive 10 according to an embodiment of the invention. A magnetic disk 11 is a data recording medium. It is a non-volatile recording disk on which data is recorded by magnetization of a magnetic layer. A base 12 is fixed, via a gasket (not shown), to a cover 13 for covering an upper opening of the base 12, thereby forming a disk enclosure in which the constituent elements of the magnetic disk drive 10 can be air-tightly accommodated. Numeral 30 denotes a spindle motor integrally attached to the base 12. The magnetic disk 11 is fixed to the spindle motor 30 with a clamp 14. The magnetic disk 11 is rotationally driven at a predetermined angular rate (speed) by the spindle motor 30. When the magnetic disk drive 10 is not operating, the magnetic disk 11 stays still. Numeral 50 denotes an actuator which holds and moves a head gimbal assembly (HGA) 40 (see FIG. 2). The actuator 50 is swingably held by a pivot assembly 51 which has a rotary shaft including a bearing. Numeral 53 denotes a voice coil motor (VCM). Numeral 57 denotes a lamp used to retract a head slider 41 (see FIG. 2) from above the surface of the magnetic disk 11 when the magnetic disk 11 stops rotating.

Figure 2:
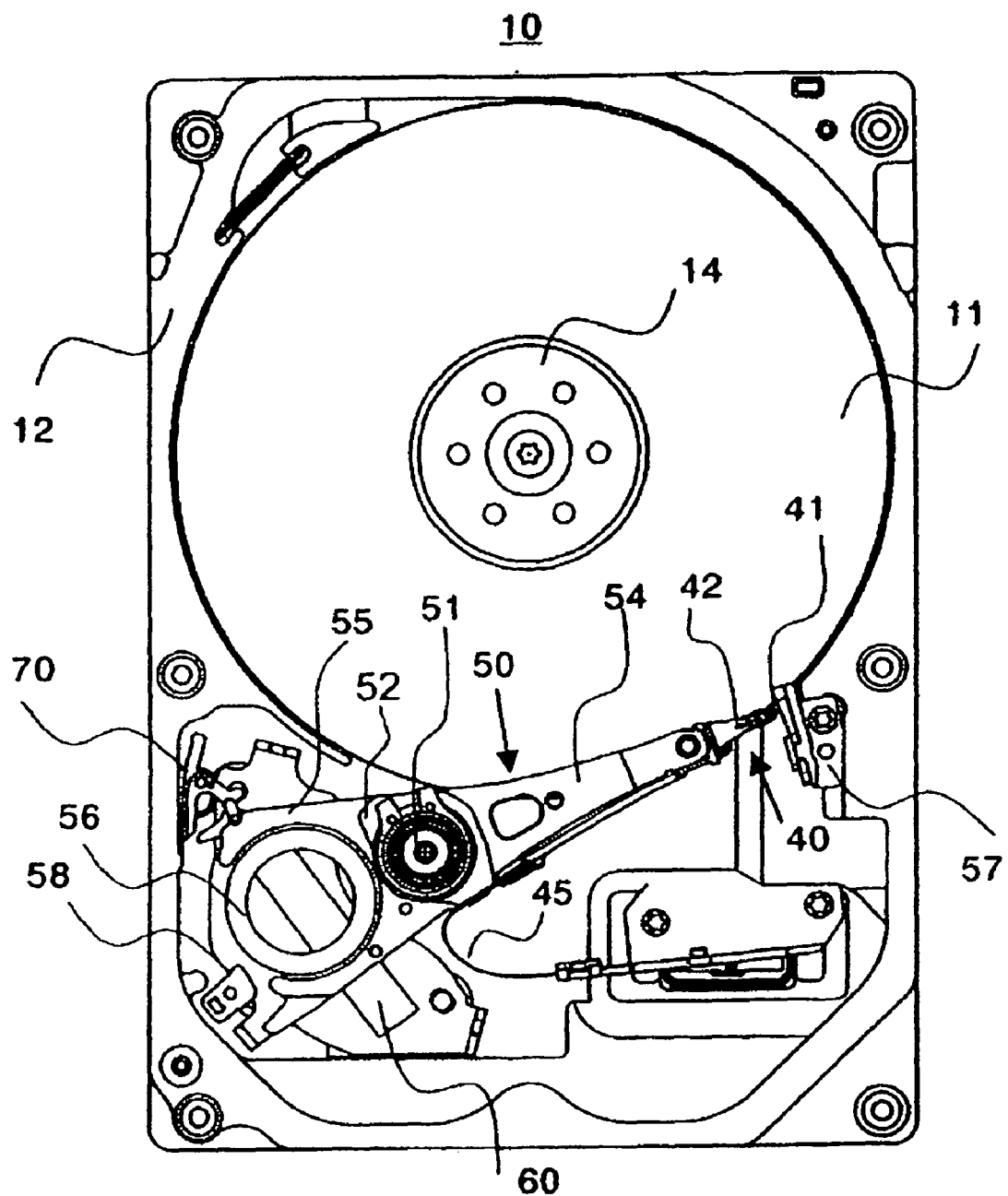
FIG. 2 is a plan view showing the magnetic disk drive according to one embodiment.

FIG. 2 is a plan view showing the magnetic disk drive 10 in an uncovered state with the actuator 50 stopped (unloaded) and the upper yoke of the VCM 53 removed so as to show the structure of the actuator 50.

Numeral 40 denotes the HGA provided with a magnetic head (not shown) which writes data inputted from a host computer (not shown) on the magnetic disk 11 or reads data to be outputted to the host computer from the magnetic disk 11. The magnetic head is formed integrally with a write element which converts an electrical signal into a magnetic field based on data to be written on the magnetic disk 11 and a read element which converts a magnetic field read from the magnetic disk 11 into an electrical signal. It is also possible to form a write element and a read element separately. Embodiments of the invention can also be applied to a magnetic disk drive having only either one of a write element and a read element. The magnetic head is formed on a side of the head slider 41. The magnetic head is assembled with the head slider 41 and a suspension 42 to make up the HGA 40.

The electrical signals are transmitted via a signal transmission path formed in a flexible cable 45 attached to the actuator 50. A temperature sensor (not shown) is attached to a portion of the flexible cable 45, so that the temperature in the disk enclosure can be detected.

The actuator 50 is provided with a carriage 52 and the voice coil motor (VCM) 53 serving as a drive mechanism. The carriage 52 includes the HGA 40, an arm 54, and a coil support 55 which are coupled in the mentioned order as seen from an end portion thereof where the head slider 41 is disposed. The suspension 42 supports the head slider 41 at one point using a dimple (not shown) provided on its side opposing the magnetic disk 11.

The coil support 55 holds a flat coil 56 such that the flat coil 56 is positioned between the coil support 55 and a magnet attached to the VCM 53.

A tab (not shown) is formed in an end portion of the suspension 42. The tab causes, by moving onto the lamp 57, the head slider 41 to move away from the magnetic disk 11. The lamp 57 is attached to the bottom surface or side surface of the base 12 to be close to an outer circumferential end portion of the magnetic disk 11.

The VCM 53 can move the head slider 41 to over the recording surface of the magnetic disk 11 by swinging the actuator 50 about the pivot assembly 51 according to a drive signal caused to flow through the flat coil 56 by a VCM driver which is a drive circuit of the VCM 53. The VCM 53 can also move the head slider 41 from over the recording surface of the magnetic disk 11 onto the lamp 57.

To read or write data from or to the magnetic disk 11, the actuator 50 moves the head slider 41 to over a data area on the surface of the magnetic disk 11. Swinging of the actuator 50 moves the head slider 41 radially over the recording surface of the magnetic disk 11. This allows the head slider 41 to be positioned over a desired track of the magnetic disk 11. The head slider 41 is kept floating a predetermined distance above the magnetic disk 11. This is achieved when the pressure generated by the viscosity of the air between the floating surface facing the magnetic disk 11 of the head slider 41 and the surface of the magnetic disk 11 being rotated is balanced with the pressure applied toward the magnetic disk 11 by the suspension 42.

If, when the magnetic disk 11 stops rotating, the head slider 41 is allowed to stop being floated and land on the surface of the magnetic disk 11, the data area of the magnetic disk 11 may be damaged, or stiction may occur between the surfaces of the head slider 41 and magnetic disk 11 making the magnetic disk 11 unable to rotate. To avoid such problems, when the rotation of the magnetic disk is stopped, the actuator 50 is moved to move (unload) the head slider 41 from over the data area of the magnetic disk 11 to over the lamp 57. Namely, the actuator 50 swings toward the lamp 57 causing the tab formed in an end portion of the suspension 42 to move sliding over the surface of the lamp 57 to be positioned on a parking spot (stopping spot) on the lamp 57. In this way, the head slider 41 is unloaded from over the magnetic disk 11 (to its home position). For loading, the actuator 50 held on the parking spot is moved off the lamp 57 to over the surface of the magnetic disk 11.

The magnetic disk 11 is a non-volatile recording medium on which data is recorded by magnetization of a magnetic layer. It is rotationally driven at a predetermined speed about the spindle shaft of the spindle motor 30. Plural tracks are concentrically formed as data storage partitions on the surface of the magnetic disk 11, each of the plural tracks having plural data sectors partitioned along the circumferential direction.

On the surface of the magnetic disk 11, plural servo areas corresponding to servo sampling frequencies are also formed circumferentially. The data sectors are formed to be synchronous with the servo areas. The magnetic disk drive 10 is connected to a host computer (not shown) to be used as an external storage device allowing data to be exchanged between the host computer and the magnetic disk drive 10.

In the following, an embodiment of the actuator will be described. First, advantages of using a circular coil and a rectangular magnet will be described.

As shown in the plan view of FIG. 2, the present actuator mechanism uses a circular coil. As already mentioned, a circular coil is advantageous in that a high yield can be achieved in coil production In making a circular coil, a wire can be uniformly wound around a circular winding core while applying a certain tensile force to the wire. In this way, a coil with individual turns of the wire firmly adhering to adjacent ones can be obtained to realize an enhanced structural strength of the coil. Furthermore, being circular of the coil can increase the rigidity of the coil.

Because the coil is circular, the base portion of the coil support 55 included in the carriage 52 can have a large width so as to enhance the coil support rigidity. Namely, the rigidity against bending and torsion of the coil support included in the actuator 50 can be enhanced.

As shown in the plan view of FIG. 2, the present actuator mechanism uses a rectangular magnet. Because a rectangular magnet can be produced through very simple processes, a high production yield can be achieved while contributing toward a cost reduction. To be concrete, rectangular magnets to be used in magnetic disk drives can be obtained by preparing a rectangular parallelepiped magnet ingot of a predetermined size and slicing the ingot into rectangular magnets. Because the rectangular magnets produced as described above each have a very simple circumferential shape, they need not be polished. Subsequently, they are each magnetized such that they have a north pole on one side of a neutral line and a south pole on the other side of the neutral line, the neutral line being a short axis at a predetermined position of each of the rectangular magnets.

The characteristics of the positional relationship between the circular coil and the rectangular magnet will be described below.

Figure 3:
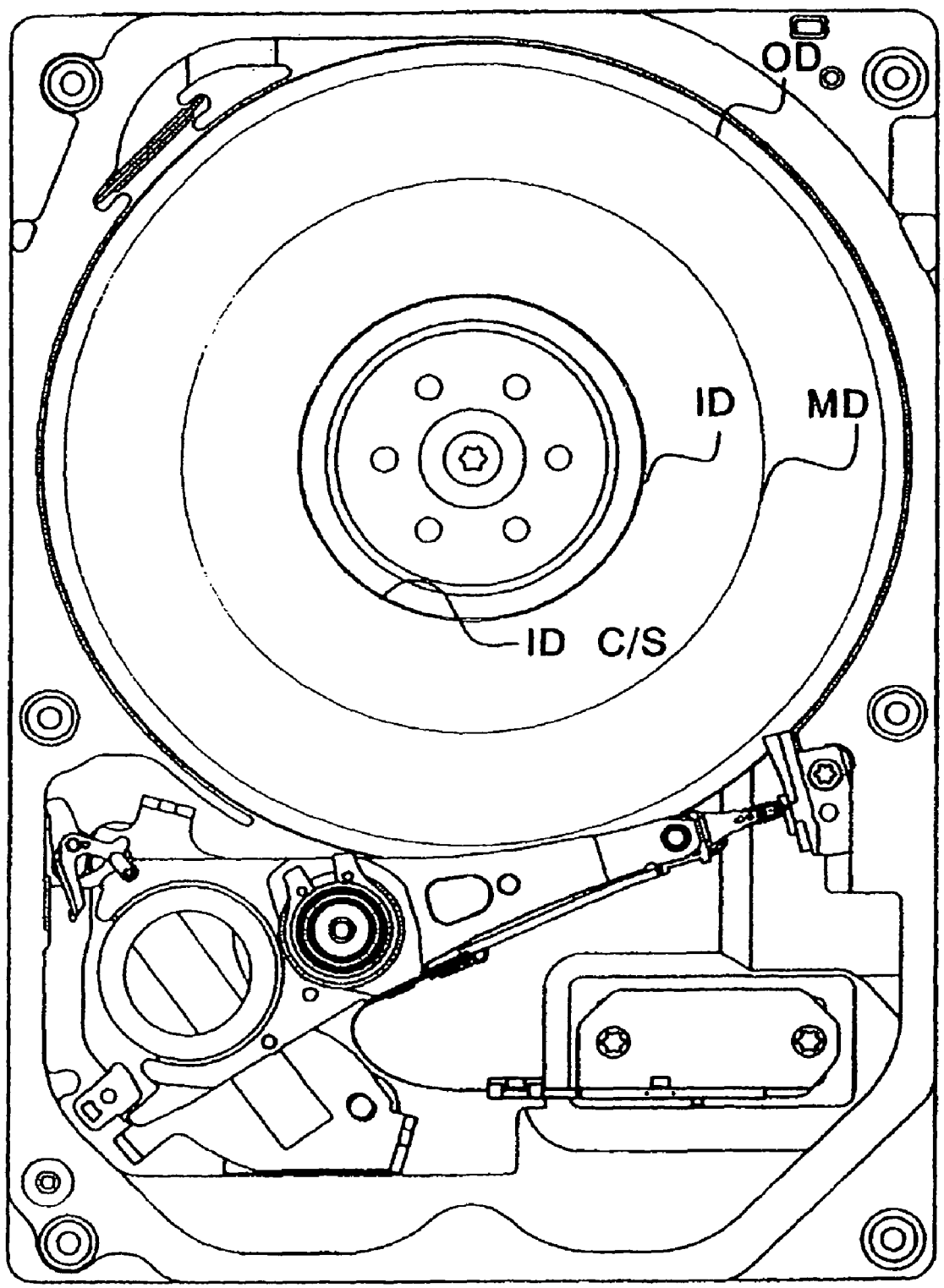
FIG. 3 is a plan view showing a track arrangement on a magnetic disk according to one embodiment.

FIG. 3 shows, regarding the data area on the magnetic disk 11, an outermost circumference (OD), an innermost circumference (ID), a middle circumference (MD) between the outermost circumference and the innermost circumference, and an inner crash stop position (ID C/S). When the magnetic head reaches the inner crash stop position, a crash stop 58 is contacted. In FIG. 3, the actuator mechanism is shown, having been pulled back onto the lamp 57, resting on the home position. The outer shape and position of the rectangular magnet is determined as follows.

Figure 4:
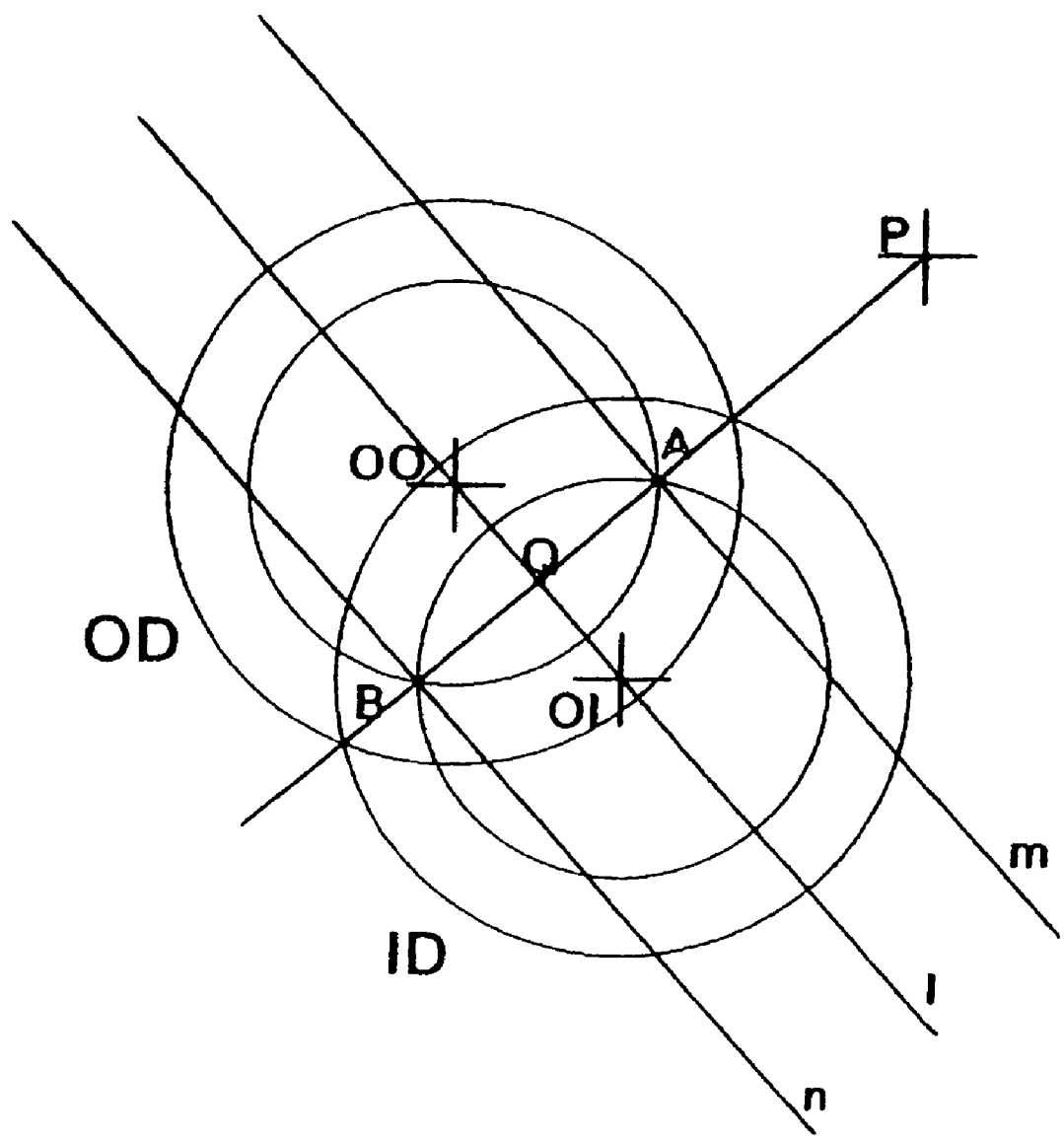
FIG. 4 is a plan view showing positions of a coil included in an actuator mechanism of the magnetic disk drive according to one embodiment.

FIG. 4 shows the positions of the circular coil with the magnetic head at an OD position and at an ID position, respectively. In FIG. 4, the coil that is, in reality, approximately circularly shaped is approximated to be perfectly circular with its inner and outer circumferences being concentric. A point P represents the pivot shaft location of the magnetic disk drive. A point OO represents the center of the circular coil with the magnetic head at the OD position. A point OI represents the center of the circular coil with the magnetic head at the ID position. Points A and B represent the two intersection points between the inner circle of the circular coil with the magnetic head at the OD position and the inner circle of the circular coil with the magnetic head at the ID position, respectively, the point A being closer to the point P than the point B. The points P, A, and B are linearly aligned. A straight line 1 connects the points OO and OI, and perpendicularly crosses a straight line AB at a point Q. A straight line m passes the point A, and extends in parallel to the straight line 1. A straight line n passes the point B, and extends in parallel to the straight line 1.

The neutral line between the two poles of the rectangular magnet is overlapped with the straight line AB. Namely, the polarities S and N of the rectangular magnet are divided by the straight line AB. A point OM (see FIG. 6) which is the center of the circular coil with the magnetic bead at an MD position, lies on the straight line AB. This is because it is necessary to switch the magnetic polarity based on the circular coil position with the magnetic head at the MD position. The magnetic neutral line position between the two poles of the rectangular magnet can be thus determined. The rectangular magnet is disposed longitudinally perpendicularly to the straight line AB, i.e. longitudinally in parallel to the straight line 1.

The length in the short axis direction, i.e. the width, of the rectangular magnet is required to be equal to or smaller than the inner diameter of the circular coil. This is because, if the rectangular magnet has a larger width, overlapping occurs between the coil portion where a dielectric force is generated on one polarity side and the coil portion where a dielectric force is generated on the other polarity side.

Furthermore, the magnet width is desired to be equal to or shorter than the straight line AB. The inner circumference of the coil comes closest to the magnetic neutral line when the magnetic head is at the OD or ID position. The magnetic field direction is not uniform in the vicinity of the magnetic neutral line, so that, if the coil enters the magnetic field in such an area, the coil is caused to generate unwanted force components which excite vibrations of the coil support in bending and torsional directions.

Figure 5:
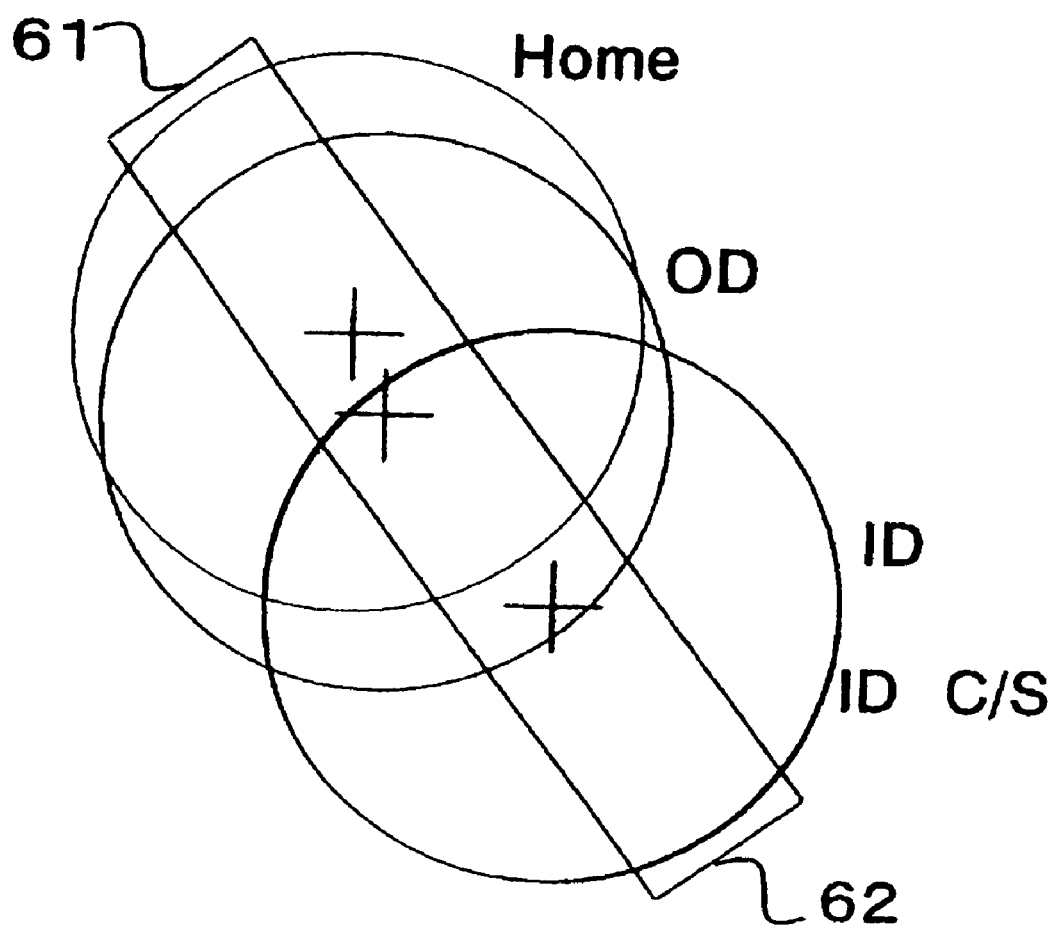
FIG. 5 is a plan view showing an external shape of the coil and a position of a magnet both included in the actuator mechanism of the magnetic disk drive according to one embodiment.

FIG. 5 shows the circular coil positions with the magnetic head at the ID C/S, ID, OD, and home positions shown in FIG. 3, respectively. The torque constant of the voice coil motor including the circular coil and the rectangular coil is desired to be constant as much as possible over the magnetic head position range of the OD position to the ID position. Even when the magnetic head is at the home position, the voice coil motor, to be able to move the actuator mechanism from over the lamp to over the magnetic disk, is required to secure a torque constant approximately equivalent to 70% of the torque constant available for the above magnetic head position range. Hence, a longitudinal left end face 61 of the rectangular magnet is required to be outside the outer circumference of the circular coil with the magnetic head at the home position so as to secure an effective coil area large enough to secure a required torque constant. Similarly, on the ID position side, a longitudinal right end face 62 of the rectangular magnet is required to be outside the outer circumference of the circular coil with the magnetic head at the ID C/S position so as to secure a torque constant required when the magnetic head is at the ID C/S position. In FIG. 3, because the ID and ID C/S circumferences are almost identical, the corresponding circular coil positions are shown almost overlapped with each other. Since the left and right end faces are positioned outside the outer circumference of the circular coil, they need not be perpendicular to the long axis direction of the rectangular magnet. That is, the magnet need not necessarily be rectangular. It may be, for example, be in the shape of a trapezoid or parallelogram.

In cases where a torque constant required when the magnetic head is at the home position or IC C/S position can be secured, the left and right end faces of the magnet need not be completely outside the outer circumference of the circular coil.

Thus, the length in the short axis direction, length in the long axis direction, orientation of the long axis direction, and position of the magnetic neutral line can be determined for the rectangular magnet. The length in the short axis direction of the rectangular magnet is determined, based on the torque constant value required for the magnetic disk drive, not to exceed the inner diameter of the coil.

The position of the long axis of the rectangular magnet will be described below. As described above, the torque constant of the VCM is desired to be constant as much as possible over the magnetic head position range of the OD position to the ID position. In this regard, the torque ripple is desired not to exceed 8%, even though a torque ripple of about 10% is tolerated in general cases.

Figure 6:
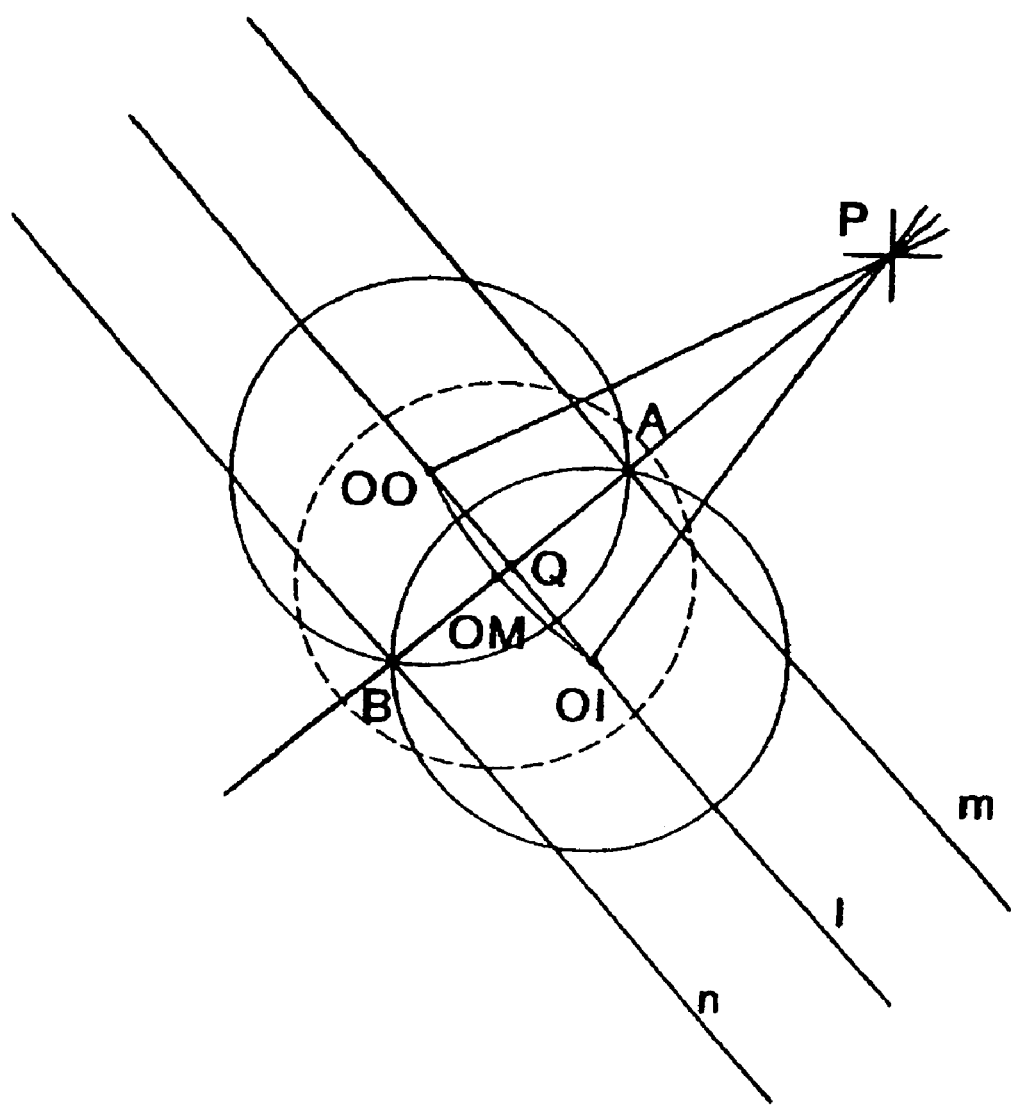
FIG. 6 is a plan view showing a course along which the center of the coil included in the actuator mechanism of the magnetic disk drive according to one embodiment moves.

FIG. 6 shows the course along which the center of the circular coil moves when the actuator mechanism moves from the OD position to the ID position. The broken-line represents the inner circumference of the circular coil with the magnetic head at the MD position. The course followed by the center of the circular coil leads from the point OO to the point OI forming a circular arc about the point P. The point OM represents the intersection point between the straight line AB and the circular arc. Namely, the point OM is the center of the circular coil with the magnetic head at the MD position. As seen from FIG. 6, when the actuator mechanism moves from the OD position to the ID position, the circular coil is shifted, relative to the long axis of the magnet, by a distance represented by a line segment OM-Q. The positional shift of the circular coil is a factor to vary the torque constant.

When the actuator mechanism moves from the OD position to the ID position, the position and area of the effective coil portion that generates the dielectric force for driving the actuator vary. When the actuator mechanism is at a position other than the MD position, the position and area of the effective coil portion on the north pole side are asymmetrical to those on the south pole side. This is another factor to vary the torque constant.

The shape of the yoke included in the VCM affects the state of magnetic fluxes (magnetic field) around the external periphery of the magnet in the VCM. Therefore, even if the magnet is shaped symmetrically with respect to its magnetic neutral line, the magnetic field in the VCM can become asymmetrical. This is still another factor to vary the torque constant.

Figure 7:
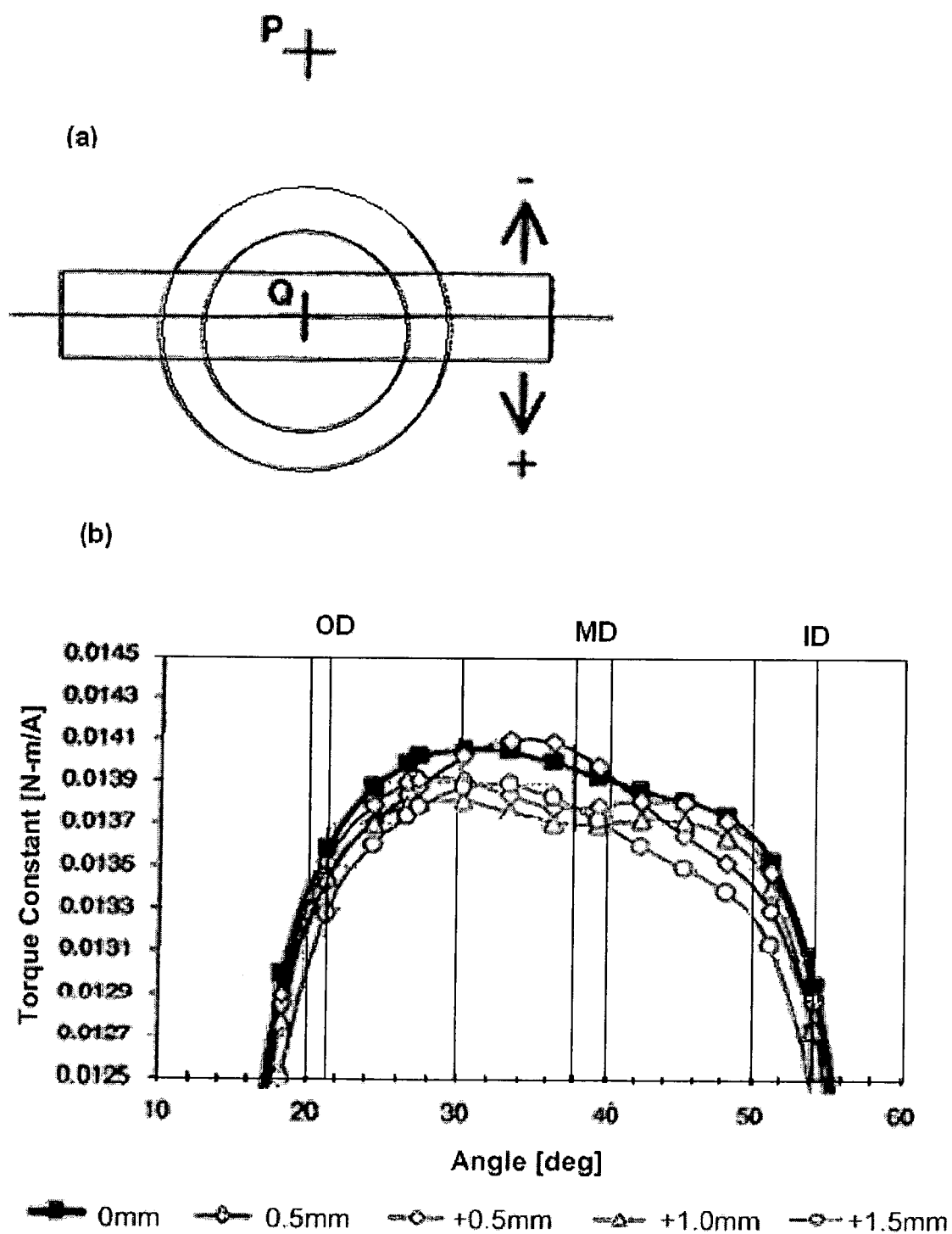
FIGS. 7(a) and 7(b) are graphs showing torque constant variations over different positions of the coil included in the actuator mechanism of the magnetic disk drive according to one embodiment.

The graph in FIG. 7 shows variations of the torque constant (torque curves) of the VCM used in one embodiment. The plural torque curves correspond to plural positions of the rectangular magnet relative to the circular coil. As shown in FIG. 7(a), the position of the rectangular magnet where the central long axis of the rectangular magnet is overlapped with the straight line 1 is set as a reference position. The torque curves have been plotted shifting the magnet position in 0.5 mm steps in the positive or negative direction, the positive direction being away from the pivot shaft and the negative direction being toward the pivot shaft.

Figure 8:
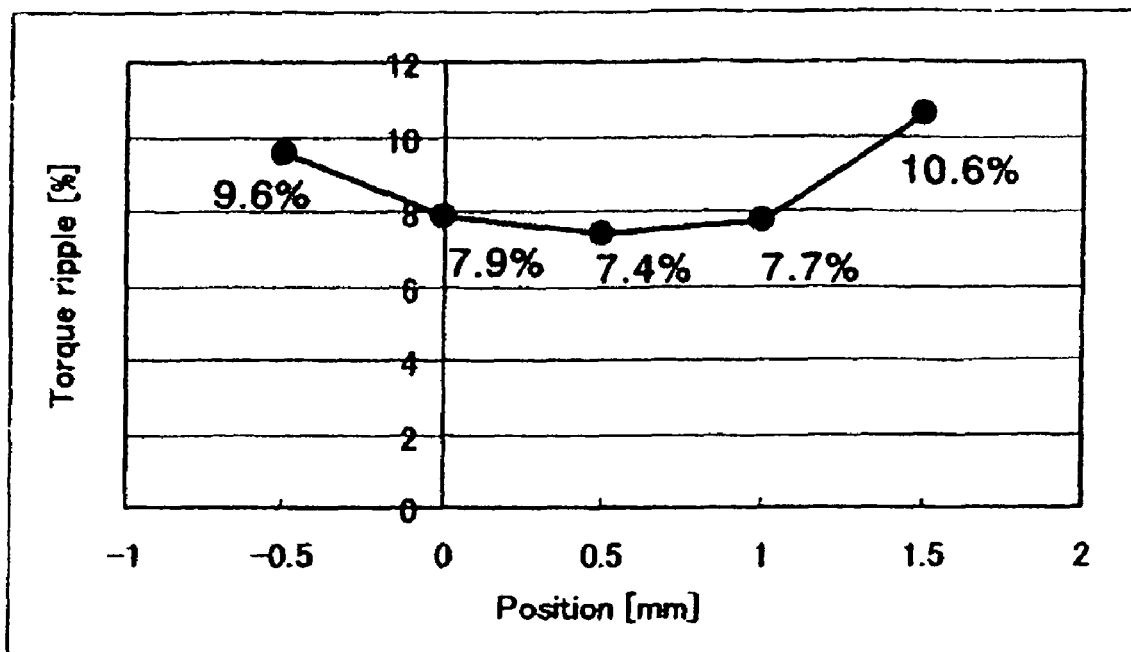
FIG. 8 is a graph showing torque ripples measured at different positions of the coil included in the actuator mechanism of the magnetic disk drive according to one embodiment.

FIG. 7(b) shows torque curves plotted for different positions of the magnet. In the graph, the torque curves are not symmetric with respect to the MD position line. This is attributable to effects of an asymmetric shape of the yoke as described above. FIG. 8 shows torque ripples measured for the magnet positions indicated in FIG. 7. The torque ripple for each magnet position is determined by dividing the difference between the maximum and minimum torque-constant values given by the torque curve plotted over the actuator position range of the OD position to the ID position by the average torque-constant value over the same actuator position range.

As the graph in FIG. 8 shows, the torque ripple is minimum with the magnet at the plus 0.5 mm position. Namely, the torque ripple is smaller when the central long axis of the rectangular magnet is more away, than the straight line 1, from the pivot shaft than when the central long axis of the rectangular magnet is overlapped with the straight line 1. Similarly, it can be said that the torque ripple is smaller when the center of the inner circle of the circular coil with the actuator at the MD position is more away, than the central long axis of the rectangular magnet, from the pivot shaft.

Further shifting the magnet in the positive direction beyond the plus 0.5 mm position gradually increases the torque ripple causing it to slightly exceed the maximum allowable torque ripple of 10% at the plus 1.5 mm position. When the magnet is shifted to the plus 1.5 mm position, the central long axis of the rectangular magnet is shifted beyond the point OM.

It is known from the above that the torque ripple is minimum when the rectangular magnet is positioned such that its central long axis passes the area surrounded by the straight line 1 and a circular arc OO-OM-OI. In other words, the torque ripple is minimum when the rectangular magnet is positioned such that its central long axis crosses the line segment OM-Q. When the rectangular magnet is positioned in such a range, the torque ripple can be held at or below 8%.

Shifting the rectangular magnet in the negative direction from the reference position is not desirable, since doing so only increases the torque ripple.

The magnet used in the VCM included in the magnetic disk drive of the embodiments is a neodymium magnet which is a rare-earth magnet. In cases where the torque constant required for the magnetic disk drive is adequately small, a ferrite magnet may be used. Using a ferrite magnet can further reduce the material cost of the VCM.

Specific embodiments of the invention have been described with reference to the attached drawings. The invention, however, is not limited to the embodiments illustrated in the drawings. It can be applied to any structure of a magnetic disk drive as long as effects of embodiments of the invention can be achieved. For example, it can be applied to a magnetic disk drive using contact start/stop mode.

What is claimed is:

1. A magnetic disk drive comprising:
a magnetic disk having a data area;
a spindle motor linked to the magnetic disk to rotate the magnetic disk; and
an actuator mechanism which positions a magnetic head at a predetermined position by swinging, over the magnetic disk, the magnetic head about a pivot shaft;
wherein the actuator mechanism includes a single coil in the shape of a circle and a single magnet in the shape of a rectangle, said circle of said coil having a diameter that is greater than a width of said rectangle of said magnet and wherein said circle overlaps a portion of said rectangle.

2. The magnetic disk drive according to claim 1, wherein:
a long axis direction of the rectangular magnet is oriented parallel to a straight line connecting two points, one of the two points being a first center of an inner circle of the circular coil in a state in which the actuator is positioned at an outermost circumference of the data area, the other of the two points being a second center of the inner circle of the circular coil in a state in which the actuator is positioned at an innermost circumference of the data area.

3. The magnetic disk drive according to claim 2, wherein:
a length in a short axis direction of the rectangular magnet is equal to or shorter than a length of a straight line connecting intersection points between the inner circle (a first circle) of the circular coil in a state in which the actuator is positioned at the outermost circumference of the data area and the inner circle (a second circle) of the circular coil in a state in which the actuator is positioned at the innermost circumference of the data area.

4. The magnetic disk drive according to claim 3, wherein:
a central long axis of the rectangular magnet is positioned on a side opposite to the pivot shaft with respect to the straight line connecting the first center and the second center.

5. The magnetic disk drive according to claim 3, wherein:
a third center of the inner circle of the circular coil in a state in which the actuator is positioned at a middle circumference of the data area is positioned on a side opposite to the pivot shaft with respect to the central long axis of the rectangular magnet.

6. The magnetic disk drive according to claim 4, wherein:
the central long axis of the rectangular magnet passes an area surrounded by the straight line connecting the first center and the second center and a circular arc about the pivot shaft, the circular arc passing the first center, the second center, and the third center.

7. The magnetic disk drive according to claim 5, wherein:
the central long axis of the rectangular magnet passes an area surrounded by the straight line connecting the first center and the second center and a circular arc about the pivot shaft, the circular arc passing the first center, the second center, and the third center.

8. The magnetic disk drive according to claim 1, wherein:
the straight line connecting the intersection points between the first circle and the second circle and a neutral line of the rectangular magnet are overlapped with each other.

9. The magnetic disk drive according to claim 2, wherein:
a length in a short axis direction of the rectangular magnet is equal to or shorter than a diameter of the inner circle of the circular coil.

10. The magnetic disk drive according to claim 1, wherein:
a first end face in a long axis direction of the rectangular magnet is positioned outside an outer circumference of the circular coil in a state in which the actuator is held at a home position and a second end face in the long axis direction of the rectangular magnet is positioned outside the outer circumference of the circular coil in a state in which the actuator is in contact with a crash stop on an inner circumference side.

* * * * *